US012686468B2

(12) United States Patent (10) Patent No.: US 12,686,468 B2
Reck et al. (45) Date of Patent: Jul. 21, 2026

(54) METHOD FOR OPERATING A DRIVE ASSEMBLY OF AN ELECTRIC BICYCLE

(71) Applicant: Robert Bosch GmbH, Stuttgart (DE)

(72) Inventors: Joseph Reck, Weil Im Schoenbuch (DE); Matthias Weinmann, Balingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/007,505

(22) Filed: Jan. 1, 2025

(65) Prior Publication Data

US 2025/0223008 A1 Jul. 10, 2025

(30) Foreign Application Priority Data

Jan. 5, 2024 (DE) ..................... 10 2024 200 125.2

(51) Int. Cl.
B62M 25/08 (2006.01)
B62M 6/45 (2010.01)
(52) U.S. Cl.
CPC .............. B62M 25/08 (2013.01); B62M 6/45 (2013.01)

(58) Field of Classification Search
CPC ................................ B62M 25/08; B62M 6/45
See application file for complete search history.

(56) References Cited

U.S. PATENT DOCUMENTS

2020/0023726 A1* 1/2020 Tsuda .................... B60W 30/19
2021/0188394 A1* 6/2021 Shahana ................ B62M 11/02
2025/0115136 A1* 4/2025 Srinivasan .............. B60L 15/20

FOREIGN PATENT DOCUMENTS

DE 10 2013 206 163 A1 10/2014
WO WO-2012127823 A1 * 9/2012 .............. B62M 6/65

* cited by examiner

*Primary Examiner* — Tisha D Lewis
(74) *Attorney, Agent, or Firm* — Maginot, Moore & Beck LLP

(57) ABSTRACT
A method of operating a drive assembly of an electric bicycle is disclosed, wherein the drive assembly has a drive unit and a shift control which can be actuated in a controlled manner. The method includes (i) determining a current drive load of the drive unit, (ii) increasing a motor speed of the drive unit in a controlled manner to an engagement speed at which the drive load reaches a predetermined engagement load, and (iii) performing controlled shifting via the shift control while operating the drive unit at a maximum of the engagement speed.

20 Claims, 1 Drawing Sheet

METHOD FOR OPERATING A DRIVE ASSEMBLY OF AN ELECTRIC BICYCLE

This application claims priority under 35 U.S.C. § 119 to patent application no. DE 10 2024 200 125.2, filed on Jan. 5, 2024 in Germany, the disclosure of which is incorporated herein by reference in its entirety.

The present disclosure relates to a method for operating a drive assembly of an electric bicycle, a drive assembly of an electric bicycle, as well as to an electric bicycle.

BACKGROUND

Electric bicycles with drive assemblies are known which comprise a drive unit for generating a motor torque to provide motorized support to a manual pedaling force of a rider, and which comprise a shift control with a plurality of different gears. Also known are automatic or semi-automatic shift controls, which can perform automatic shift operations. It is also known that when the shift operation is performed, the drive unit of the electric bicycle is automatically actuated, for example, in order to enable a derailleur to be shifted even when the bicycle is stationary. Such an electric bicycle is shown in DE 10 2013 206 163 A1.

SUMMARY

In contrast, the method according to the disclosure having the features set forth below is characterized by the fact that automatic shift operations can be performed for an electric bicycle in a particularly simple and efficient manner. In particular, particularly low-wear and fast shifting can be made possible in a simple manner. This is achieved according to the present disclosure by a method for operating a drive assembly of an electric bicycle, wherein the drive assembly comprises a drive unit and a shift control which can be actuated in a controllable manner, and wherein the method comprises the steps of:

determining a current drive load of the drive unit, increasing a motor speed of the drive unit in a controlled manner to an engagement speed at which the drive load reaches a predetermined engagement load, and shifting in a controlled manner via the shift control while operating the drive unit at up the engagement speed, at maximum.

In particular, a torque and/or a force is determined as the drive load.

Preferably, a motor load of the drive unit, that is, in particular, a current generated motor torque of the drive unit, is determined as the drive load. The motor load may be calculated directly, for example, by way of a sensor, or alternatively, from the flowing measured currents that supply power to the drive unit, as well as previously known motor parameters. Alternatively or additionally preferably, a load on an output element, such as a chainwheel, and/or on a transmission element, such as a chain, may be determined as a the drive load. Further alternatively or additionally preferably, a load at a further point of a drive train of the electric bicycle, for example on a cassette on a rear wheel hub, can be determined as the drive load.

Preferably, the current drive load, in particular the motor load generated directly on the drive unit, is determined by an estimate based on the operation of the drive unit. Preferably, the drive load may be estimated based on an actuation signal and/or actuation current by which the drive unit is actuated. Alternatively or additionally preferably, the current drive load may be determined by way of a sensor, for example a torque sensor and/or a force sensor.

Preferably, the drive load may be determined on various sections of the drive train of the electric bicycle from sensor signals, and preferably additionally from a mathematical model of the drive unit and the drive train. In particular, sensors or sensing methods may be used: a direct detection of the motor torque, for example, measured by a torque sensor, and/or a calculation of the motor torque based on a current measurement along with previously known motor parameters; a sensed rotor position signal of the drive unit.

Particularly, such a load, which is characteristic of a minimum load causing the drive unit to engage with a propulsion via the drive train of the electric bicycle, is considered as an engagement load. That is, operation of the drive unit at least in part causes propulsion of the electric bicycle at least at the engagement load. In other words, by increasing the motor speed to the engagement speed at which the engagement load is reached, the drive unit is rotated just as quickly as possible to allow mechanical torque-transmitting engagement of the drive unit with the drive train.

In other words, the method increases motor speed, preferably incrementally, until the drive unit is engaged with the torque-transmitted path of the drive train. Stated differently, the drive unit is operated such that the engaged state is actuated by way of the controlled increase in motor speed. The shift operation is performed by controlled shifting at a maximum of the engagement speed at which this engagement state is present. That is to say, preferably, shifting is carried out at a speed that is at least slightly lower than the engagement speed.

The method thus offers the advantage that automatic shift operations can be carried out in a particularly simple manner, with low wear and within a short time. Through, for example, software-based estimation of the current drive load and by increasing the motor speed to the engaged state, the shift operation can be performed at the highest possible motor speed while the drive unit is not yet significantly engaged in torque transfer. The shifting operation can thus be carried out particularly smoothly and with low wear, for example, since shifting operations can be carried out as load-free as possible. It is particularly advantageous that automatic and manual shifts can be performed by the rider of the electric bicycle without pedaling. For example, when the electric bicycle is rolling, the shift operation may be performed such that the drive unit is operated at a shift speed that is just below the engagement speed, wherein the drive unit drives the chain drive of the electric bicycle, thereby providing efficient and low-wear shifting as quickly as possible. In particular, when the rider starts to pedal again, the desired gear is already engaged without the rider having to take any further action.

Preferred refinements of the disclosure are also set forth below.

Preferably, the method further comprises the following step: determining a shift speed such that the shift speed is less than the engagement speed by a predetermined shift offset. In this case, the controlled shift is carried out by way of the shift control at the shift speed. That is to say, in the method, a predetermined shift speed is set at which the drive unit is to rotate and at which the shifting occurs. The shift speed is less than the engagement speed by the shift offset. In particular, however, the sonic speed is always set such that it is greater than 0 rpm. This ensures, in a simple and reliable manner, that the shifting occurs without engagement of the drive unit with the drive train.

Particularly preferably, the shift offset is at least 5% of the determined current engagement speed. That is, the shift speed is 5% less than the engagement speed. Preferably, the shift offset is at least 10%, particularly at most 30%, of the engagement speed. Alternatively, preferably, the shift offset is at least 5 rpm. That is, the shift offset may be defined as a predetermined amount of speed by which the engagement speed is reduced with regard to the shift speed. Preferably, the shift offset is at least 10 rpm, in particular a maximum of 30 rpm. By setting the shift offset as a predefined fixed percentage or absolute fraction, a particularly simple and reliable reduction of the shift speed can be enabled.

Preferably, the method further comprises the step of: controlled operation of the drive unit at the shift speed for at least a predetermined period of time and/or for at least a predetermined number of revolutions. In particular, the predetermined number of revolutions may be considered as revolutions of a drive unit motor, or alternatively, preferably, a number of revolutions in a drive train, for example, a cassette. Preferably, the predetermined period of time may be at least 0.5 seconds, preferably at least 1 second, preferably a maximum of 3 seconds. Further preferably, the predetermined number of revolutions may be at least 1 revolution, preferably at least 2 revolutions, in particular at most 4 revolutions. This allows the drive unit to be rotated for a certain amount of time and/or a certain distance after the shift speed has been determined, so that it can be ensured in a particularly straightforward and reliable manner that the shift operation can be carried out and completed during this rotation. Thus, particularly reliable and low-wear shifting may be provided without significant engagement of the drive unit in the drive train.

Preferably, the engagement load is a maximum of 15 Nm, preferably a maximum of 5 Nm, in particular at least 3 Nm. Thus, the engagement state is detected in a particularly straightforward manner by way of fixed defined values. For example, these values are based on the assumption that the corresponding torques are sufficiently small so that there is no significant transmission of torque via the drive train, which could, for example, cause a propulsion of the electric bicycle. In particular, such engagement loads are not sufficient to overcome friction in the drive train. At the same time, the values are sufficiently high to be able to avoid, for example, erroneous detections of the engagement state.

Preferably, the method further comprises the following step: determining a target speed. The controlled increase in the motor speed is carried out by continuously increasing the target speed. In particular, a temporary ongoing incremental increase in the target speed is considered to be a continuous increase. That is, a target speed is set to which the motor speed is to be increased. For example, the motor speed is increased to the target speed by way of a drive unit regulator. The target speed may be continuously increased, for example, until the engagement speed is reached. Thus, a particularly simple and flexible implementation of the method can be made possible by way of a control unit of the drive unit.

Preferably, the method further comprises the following step: limiting the target speed to a maximum target speed. Preferably, the maximum target speed is determined based on a determined rear wheel speed of a rear wheel of the electric bicycle and additionally a determined current gear ratio. The rear wheel speed may preferably be determined by way of a speed sensor. For example, the current gear ratio may be determined based on sensed speeds of the drive train and rear wheel, and/or may be determined based on tracking of shift operations. Preferably, the maximum target speed corresponds to the determined rear wheel speed multiplied by the determined current gear ratio, preferably minus a predetermined speed offset. For example, the speed offset may be at least 5%, in particular at least 10%, preferably at most 30%, corresponding to the determined maximum target speed. Alternatively, the speed offset may be a predetermined speed amount, for example at least 10 rpm, in particular a maximum of 30 rpm. In this way, the increase in motor speed may be restricted in order to provide, in a simple and reliable manner, another measure that causes the drive train to not engage and thus avoid propulsion of the cycle by controlled actuation of the drive unit.

Preferably, a determined current motor speed is initially set as the target speed. Alternatively, a calculated speed corresponding to the determined current speed minus a predetermined speed offset is initially determined as the target speed. The speed offset may be, for example, a percentage-based fraction, for example at least 2%, in particular a maximum of 10%, or alternatively, a predetermined absolute fraction, for example at least 2 rpm, in particular a maximum of 10 rpm. Further alternatively, preferably, a predefined speed can be initially defined as the target speed, e.g. a speed of at least 30 rpm, preferably at least 50 rpm, in particular a maximum of 70 rpm. Further alternatively, preferably, the target speed may be initially set to the determined current rear wheel speed multiplied by the determined current gear ratio, preferably minus a predetermined offset. In particular, the initial determination is considered to be that the target speed is set accordingly each time the method is started, that is, a specific starting point is defined. The method can thus be carried out particularly simply and efficiently.

Preferably, the method further comprises the following step: increasing the target speed in response to the end of a predetermined period of time. That is, the target speed may be increased in a timed manner. Alternatively or additionally preferably, the target speed is increased in response to a predetermined sensor signal. For example, the sensor signal may be a revolution signal of a speed sensor, for example, on a rear wheel or alternatively on the drive unit, and/or a speed sensor. Thus, a defined criterion for increasing the target speed can be easily provided, in order to approach the engagement state of the drive unit in a simple manner.

Preferably, the increase of the target speed is stopped when the drive load reaches or exceeds a predetermined load threshold. For example, a pre-defined maximum load for the drive load is considered a load threshold. In particular, shifting under high loads and propulsion of the bicycle can thus be easily avoided. Preferably, once the predetermined load threshold has been reached, the target speed is set again initially, in particular as described above. Preferably, the target speed may be increased alternatively or additionally also if other vectors exist, for example a signal indicating that the next gear has been reached when shifting and/or a shift request, for example from an automatic shift or manual operation.

Particularly preferably, the method further comprises the following step: resetting the target speed, in particular by a new initial determination of the target speed, when a sensed current cadence is greater than or equal to the current motor speed, preferably when the cadence is at least 5%, preferably at least 15%, in particular a maximum of 30%, greater than the current motor speed, and/or if the cadence is greater than the current motor speed by at least 5 rpm, preferably at least 10 rpm, in particular a maximum of 20 rpm. Alternatively or additionally preferably, the target speed is reset when the motor speed is less than or equal to a predetermined threshold for at least a predetermined period of time and/or is equal to zero for at least a predetermined period of time. Further alternatively or additionally preferably, the target speed is reset when the motor speed remains at a value less than the target speed for at least a predetermined period of time, preferably wherein the value is at least 5%, preferably at least 15%, particularly at most 30%, less than the target speed, and/or wherein the value is at least 5 rpm, preferably at least 10 rpm, particularly at most 20 rpm, less than the target speed. In particular, however, this target speed is never reset to a value that is less than zero. In this way, optimal adjustment of the shifting can be carried out easily and reliably based on changing driving conditions. In addition, in all driving conditions, a targeted and reliable execution of the method can be ensured at any time without the drive train becoming engaged for a long period of time during the method, for example, when the bicycle slows down and a rear wheel speed decreases.

Further, preferably, the current drive load is determined based on an actuation signal and/or actuation current by which actuation of the drive unit occurs. For example, a control unit signal configured for controlled actuation of the drive unit may be considered an actuation signal. Preferably, an electric current with which the drive unit is actuated may be considered as the actuating current. Further alternatively or additionally preferably, the current drive load may be determined based on a rotor position signal of a rotor position sensor of the drive unit. That is, in this case, for example, the movement of the rotor of the drive unit may be determined or tracked by the rotor position sensor to estimate the drive load based thereon. Thus, the drive load can be reliably estimated in a simple manner.

Particularly preferably, the method is carried out, in particular exclusively, during driving operation, in particular while the electric bicycle is moving forward. Alternatively or additionally preferably, the method may also be carried out while the electric bicycle is stationary.

Furthermore, the disclosure leads to a drive assembly of an electric bike comprising a drive unit, a gearshift system, and a control unit. Preferably, an actuating device may additionally be provided by way of which a rider of the electric bicycle can perform manual actuation to initiate a shift operation, for example mechanically or electrically. The shift system preferably includes a shift control with a plurality of different gears. For example, the shift control may be configured as a multi-pinion derailleur. The control unit is configured to actuate the drive unit and actuate the shift system in a controlled manner. In addition, the control unit is configured to carry out the described method.

Further, the disclosure relates to an electric bicycle comprising the described drive assembly.

BRIEF DESCRIPTION OF THE DRAWINGS

An exemplary embodiment of the disclosure is explained in detail below with reference to the accompanying drawings. The drawing shows.

DETAILED DESCRIPTION

Preferably, all identical components, elements, and/or units are provided with the same reference symbols in all figures.

Figure 1:
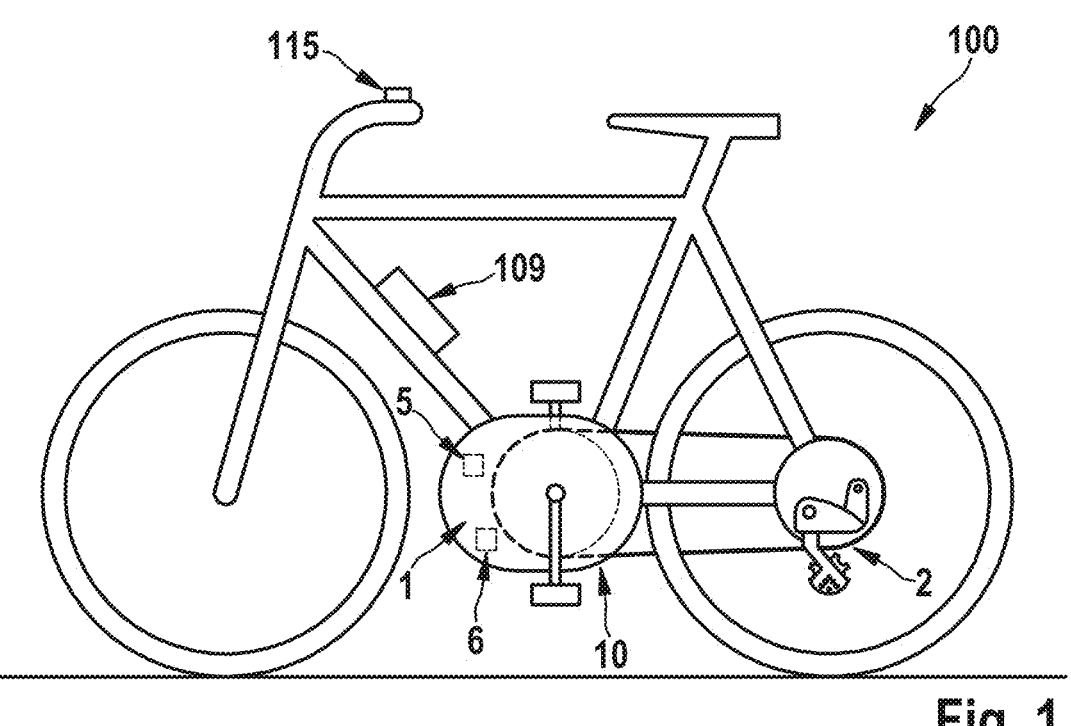
FIG. 1 is a simplified schematic view of an electric bicycle in which a method to operate a drive assembly of an electric bicycle according to a preferred exemplary embodiment example of the disclosure is carried out.

FIG. 1 shows a simplified schematic view of an electric bicycle 100 in which a method to operate a drive assembly 10 of an electric bicycle 100 according to a preferred exemplary embodiment of the disclosure is carried out.

The drive assembly 10 comprises a drive unit 1 having a motor, in particular an electric motor. The motor can be supplied with electrical energy by way of an electrical energy storage unit 109 of the electric bicycle 100.

The drive unit 1 is arranged in the region of a bottom bracket of the electric bicycle 100. A motor torque generated by the motor can be used to provide motorized support for the pedal force generated by the muscle power of a rider of the electric bicycle 100. The muscle force of the rider can be applied via a crank mechanism.

The drive assembly 10 further comprises a control unit 5, which is configured to actuate the drive unit 1 in a controlled manner. For example, the control unit 5 may control an electrical actuation current to actuate the motor of the drive unit 1.

In addition, the drive assembly 10 comprises a shift control 2, which can also be actuated in a controlled manner by way of the control unit 5. Alternatively or additionally preferably, the shift control 2 may be manually actuated by the rider of the electric bicycle 100 using an actuating device 115, which may comprise, for example, a shift lever.

For example, the shift control 2 is disposed at least on a rear hub of the electric bicycle 100 and comprises a plurality of gears to which the bicycle can shift. In particular, the shift control is a multi-pinion derailleur.

The drive unit 1 also comprises a sensor unit 6 with a rotor position sensor, with which a rotor position of a rotor of the motor can be sensed. In addition, the sensor unit 6 may comprise a current sensor to sense an actuation current by which the motor of the drive unit 1 is actuated. Based on the sensor signals from the rotor position sensor and/or the current sensor, and preferably additionally from previously known characteristics of the motor, a generated motor torque of the drive unit 1 can be determined.

Figure 2:
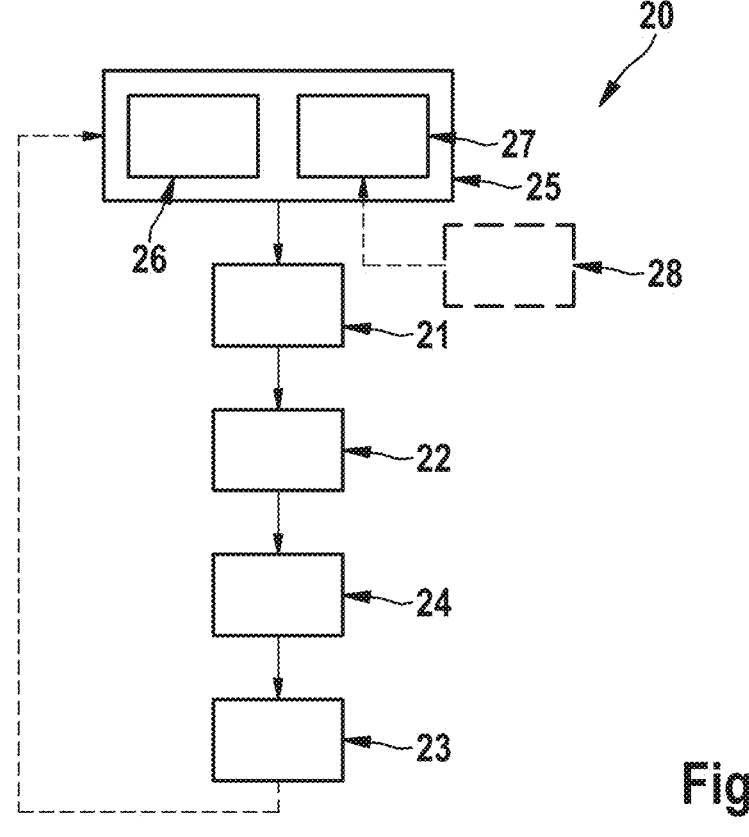
FIG. 2 is a highly simplified schematic view of the method according to the disclosure.

FIG. 2 shows a highly simplified schematic view of the steps of the method 20 for operating the drive assembly 10 of the electric bicycle 100.

In method 20, a target speed for the drive unit 1 is first determined 25. The first time the method 20 is performed, or after a resetting 27 the target speed (as will be described further below), a predefined speed of, for example, 30 rpm may be initially set as the target speed. Alternatively, the target speed may be set based on a sensed rear wheel speed multiplied by a current gear ratio and minus a predetermined offset, or also based on a sensed current motor speed minus a predetermined speed offset.

The target speed may be reset 27 when one or more states of the drive assembly 10 occur. In detail, the reset 27 is carried out to the initially determined target speed, or for example to the predefined speed.

The reset 27 may be carried out when a sensor-based detection 28 is used to detect that the current target speed is no longer appropriate for the current states or mode of operation. This is particularly the case if a sensed current cadence of a rider of the electric bicycle 100 is greater than or equal to the current motor speed of the drive unit 2. Further, if the motor speed is less than or equal to a predefined threshold for at least a predetermined period of time, and/or equal to zero, and/or remains at a value less than the target speed, this can be used as a criterion for resetting 27.

The initially determined target speed may also be incrementally increased in the step 26 at predetermined times, that is, after a predetermined period of time has elapsed. Alternatively or additionally, the increase may be in response to a detection of a predetermined sensor signal, such as a pulse of a revolution signal of a rotational speed sensor and/or speed sensor. Alternatively or additionally preferably, the increase may also be in response to another signal, for example a gear signal, which signals that the next gear has been reached, or a gear shift signal, which requests a new gear shift, or the like.

In this respect, the increase 26 of the target speed may be stopped when the drive load of the drive unit 1, determined as described below, reaches or exceeds a predetermined load threshold, for example a defined maximum torque.

In the method 20, a current drive load 21 of the drive unit 1 is then determined. Preferably, a current motor load, that is, in particular, a current motor torque of the motor of the drive unit 1, is determined as the drive load. In particular, this motor torque is estimated by an estimate based on the actuation current for actuating the drive unit 1. This may be detected directly, for example, by way of a torque sensor. Alternatively or additionally, the drive load may be calculated based on a measurement of the actuation currents of the motor and known motor parameters. Additionally, the rotor position signal from the rotor position sensor of the sensor unit 6 may be used to estimate the current drive load. Alternatively, a force or torque measurement may be carried out at any location in the drive train, for example, on a chain ring or cassette to determine the drive load.

The motor speed of the drive unit 1 is then increased 22 in a controlled manner to an engagement speed by controlled actuation of the drive unit 1. The engagement speed is defined such that it is a minimum speed at which a mechanical engagement of the drive unit 1 with a drive train of the electric bicycle 100 is affected. This is the case when a predetermined engagement load, in particular a maximum of 10 Nm, is reached.

In response to the engagement load being reached, a shift speed is determined 24.

The shift speed determination 24 is carried out such that the shift speed is less than the engagement speed at which the engagement load is reached by a predetermined shift offset. The shift offset is at least 10%, preferably 15%, of the engagement speed. Alternatively, a predetermined value, such as at least 10 rpm, preferably 15 rpm, may be used as the shift offset. That is, the motor speed of the drive unit 1 is reduced to the lower shift speed upon reaching the engagement speed.

After determination 24 of the shift speed, the drive unit 1 is operated in a controlled manner in step 23 such that it rotates at the shift speed for at least a predetermined number of revolutions. Preferably, the drive unit 1 is actuated 23 such that the motor is rotated for exactly two full revolutions. This makes it possible to ensure that the shift operation is performed at some time during this operation 23, by the chain jumping onto the corresponding sprocket for the target gear. Preferably, if the shift operation is performed automatically, this may be specifically initiated by actuating the shift operation accordingly by way of the control unit 5.

The method 20 offers the advantage that an automatic shifting of the shift system 2 can be carried out in a particularly simple and inexpensive manner, wherein particularly low wear and particularly quick execution are possible. In particular, shifting can be enabled at any time by the purposeful operation of the drive unit 1 in the engaged state, for example, even if the rider is not pedaling, in particular if there is a freewheel on the chain ring, for example.

What is claimed is:

1. A method of operating a drive assembly of an electric bicycle, wherein the drive assembly includes a drive unit and a shift control which is configured to be actuated in a controlled manner, comprising:
   determining a current drive load of the drive unit;
   increasing a motor speed of the drive unit in a controlled manner to an engagement speed at which the drive load reaches a predetermined engagement load;
   determining a shift speed such that the shift speed is less than the engagement speed by a predetermined shift offset; and
   shifting in a controlled manner using the shift control while the drive unit is in operation at the shift speed.

2. The method according to claim 1, wherein:
   the predetermined shift offset is at least 5% and at most 30% of the engagement speed, or
   the predetermined shift offset is at least 5 rpm and at most 30 rpm.

3. The method according to claim 1, further comprising:
   operating the drive unit at the shift speed in a controlled manner for at least a predetermined period of time and/or for at least a predetermined number of revolutions.

4. The method according to claim 1, wherein the predetermined engagement load is:
   a maximum of 15 Nm, and
   at least 3 Nm.

5. The method according to claim 1, further comprising determining a target speed, wherein the motor speed is increased in a controlled manner by continuously increasing the target speed.

6. The method according to claim 5, further comprising:
   limiting the target speed to maximum target speed, wherein the maximum target speed is determined based on a determined rear wheel speed and a determined current gear ratio.

7. The method according to claim 5, wherein a determined current motor speed, or the determined current motor speed minus a predetermined speed offset, or a predefined speed, or a determined rear wheel speed multiplied by a determined current gear ratio minus an offset, is initially set as the target speed.

8. The method according to claim 5, further comprising:
   increasing the target speed in response to an end of a predetermined period of time, and/or in response to a predetermined sensor signal.

9. The method according to claim 8, wherein increasing of the target speed is stopped when the drive load reaches or exceeds a predetermined load threshold.

10. The method according to claim 5, further comprising resetting the target speed when at least one of:
   a sensed cadence is greater than or equal to the current motor speed,
   the motor speed is less than or equal to a predetermined threshold for at least a predetermined period of time,
   the motor speed is equal to zero for at least a predetermined period of time, and/or
   the motor speed remains at a value less than the target speed for at least a predetermined period of time.

11. The method according to claim 1, wherein determining the current drive load is based on an actuation signal and/or an actuation current for actuation of the drive unit and/or based on a rotor position signal of a rotor position sensor of a sensor unit of the drive unit.

12. The method according to claim 1, wherein the method is carried out during travel of the electric bicycle.

13. A drive assembly of an electric bicycle, comprising:

a drive unit;

a shift system; and a controller configured to operate the drive unit and the shift system, wherein the controller is further configured to perform the method according to claim 1.

14. An electric bicycle comprising a drive assembly according to claim 13.

15. The method according to claim 1, wherein the shift speed is always greater than 0 rpm.

16. The method according to claim 1, wherein:

the predetermined shift offset is at least 10% and at most 30% of the engagement speed, or the predetermined shift offset is at least 10 rpm and at most 30 rpm.

17. The method according to claim 1, wherein the predetermined engagement load is:

a maximum of 5 Nm, and at least 3 Nm.

18. The method according to claim 5, further comprising:

increasing the target speed in response to an end of a predetermined period of time, and/or in response to a revolution signal of a rotational speed sensor and/or a speed sensor.

19. The method according to claim 1, wherein the method is carried out during forward movement of the electric bicycle.

20. A method of operating a drive assembly of an electric bicycle, wherein the drive assembly includes a drive unit and a shift control which is configured to be actuated in a controlled manner, comprising:

determining a current drive load of the drive unit;

determining a target speed;

increasing a motor speed of the drive unit in a controlled manner to an engagement speed at which the drive load reaches a predetermined engagement load, wherein the motor speed is increased in the controlled manner by continuously increasing the target speed in response to an end of a predetermined period of time and/or in response to a predetermined sensor signal, wherein increasing of the target speed is stopped when the drive load reaches or exceeds a predetermined load threshold; and shifting in a controlled manner using the shift control while the drive unit is in operation at a maximum of the engagement speed.

\* \* \* \* \*